Nov. 11, 1958     J. F. ZALESKI     2,860,338
MICROWAVE ANTENNA STRUCTURE
Filed Feb. 19, 1954     2 Sheets-Sheet 1

INVENTOR.
JOHN F. ZALESKI
BY
ATTORNEY.

Nov. 11, 1958
J. F. ZALESKI
2,860,338
MICROWAVE ANTENNA STRUCTURE
Filed Feb. 19, 1954
2 Sheets-Sheet 2
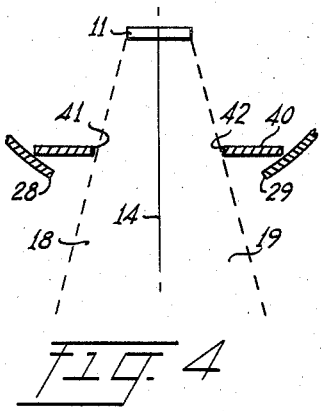
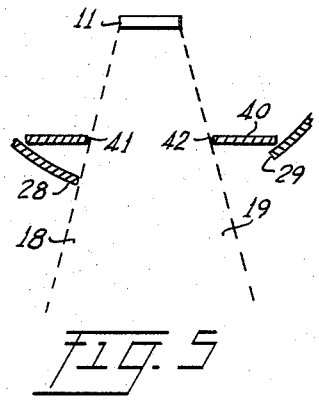
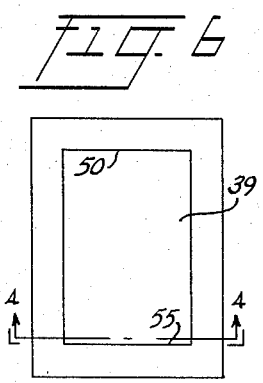
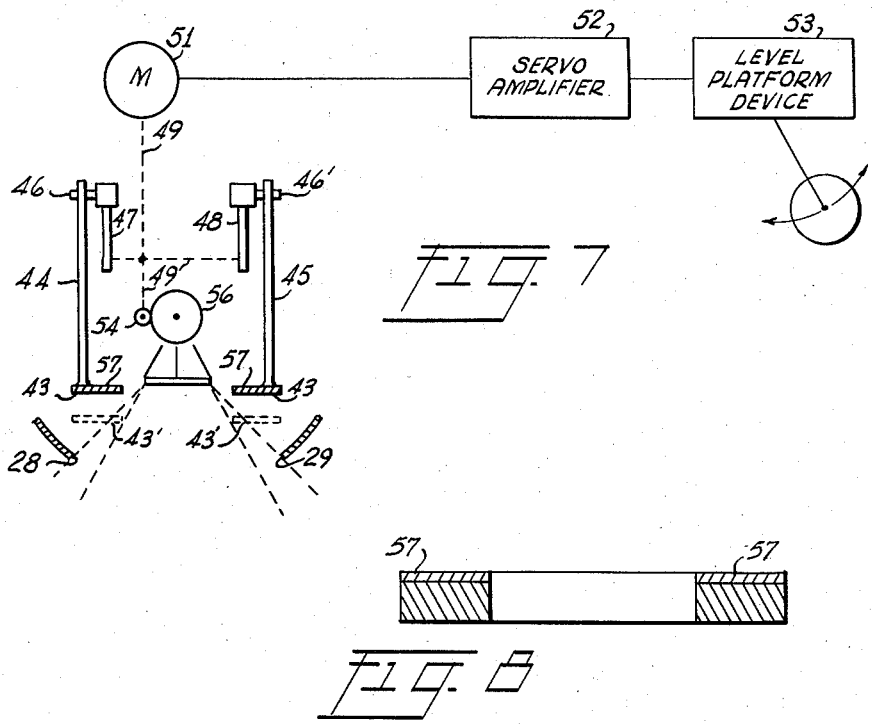
INVENTOR.
JOHN F. ZALESKI
BY
ATTORNEY.

United States Patent Office 2,860,338
Patented Nov. 11, 1958

2,860,338

MICROWAVE ANTENNA STRUCTURE

John F. Zaleski, Valhalla, N. Y., assignor to General Precision Laboratory Incorporated, a corporation of New York Application February 19, 1954, Serial No. 411,432

6 Claims. (Cl. 343—789)

This invention relates to microwave antennas and to components auxiliary thereto for controlling and shaping emitted microwave beams. More specifically, this invention relates to a microwave antenna secured behind an aperture and emitting a beam passing through the aperture.

Various systems have been proposed to measure the speed and drift of aircraft by the use of Doppler radar principles. In these systems it is usual to emit a plurality of beams of radiation in different directions so that suitable information may be obtained therefrom for translation into speed and drift as well as other measurements. For example, two beams may be used directed at angles on opposite sides of the ground track, or a third beam may be added directly along the ground track either in a generally forward or reverse direction while the beams straddling the ground track are directed in a generally opposite direction. Finally four beams may be utilized, two straddling the ground track in a generally forward direction and the remaining two straddling the ground track in a generally reverse direction.

In order to obtaine the various desired beam configurations it has been found advisable to use a planar microwave antenna constituted by a plurality of linear arrays arranged in generally parallel relation and such an array emitting four angularly disposed beams is used to illustrate the principles of the invention, although the invention is not restricted to such a specific antenna configuration.

It is aerodynamically highly desirable for an aircraft skin to be without projections, therefore a planar antenna of the form described is preferably mounted within the aircraft skin, the aircraft skin being constructed so as to be transparent to microwave radiation in the area below the antenna.

The general description so far given of the use of a planar microwave antenna in an aircraft assumes that the antenna is horizontal at all times, for when the antenna is not horizontal in the vertical plane of interest an error is introduced into the measurement. Such a system therefore includes a stable level antenna platform for accuracy. By pendulous means or otherwise this platform is made truly level and is maintained horizontal even during pitching or rolling of the aircraft.

A beam of microwave or other radiation never has perfectly defined limits, but always is subject to some fringing, so that at any transverse plane of the beam the radiation intensity does not change abruptly from full intensity within the beam to zero intensity outside thereof, but changes more or less gradually. In the case of a radar beam in which the accurate beam direction is significant, the beam direction may be defined as the direction from the antenna through the statistical center of energy of the beam cross section. It is evident then, in accordance with this definition, that the beam fringes, insofar as they contribute energy, help to define the beam direction. That is, if the fringe were cut off from one side of the beam the effective beam direction would be changed to some extent.

When a planar microwave antenna array is mounted horizontally in an aircraft so that its beams pass downward through an aperture in the aircraft and irradiate the earth, the window or aperture transparent to microwaves contains no metal or other conducting material, because the presence of such material would not only prevent passage of radiation but would reflect some radiation back to the antenna, in some cases causing spurious echo signals. The aperture is ordinarily closed with strong plastic or other dielectric material which is relatively transparent to microwave energy but which is continuous with the skin of the aircraft to avoid disturbance of airflow along the skin. Since the methyl methacrylate or other dielectric material covering the aperture will not have the strength of the metal aircraft skin and since structural beams cannot be allowed to cross the space, the window will be weaker than other parts of the aircraft's surface. It is therefore important from the standpoint of structural strength that the window be made as small as possible.

These considerations result in a construction in which the edge of the aperture touches the edges of the beams of radiation, cutting off some of their fringes. Thus the effective beam directions are slightly modified and, what is more important, in all canted positions of the antenna the beams on opposite sides are differently modified affecting the effective beam directions differently. This has a direct effect on speed and drift measurements, in which beam direction enters as a factor in the basic relationship of Doppler frequency to aircraft speed and drift. Moreover, that part of the radiation which is cut off by the edge of the aperture is not only interrupted but is reflected back to the antenna so that, in some cases, it is received by the antenna during its reception phases. The effect of these reflections on the ground echo signal reception is similar to that of noise, and therefore the presence of these interfering echoes reduces the signal-to-noise ratio $(S/N)$ and hence reduces the receiver effectiveness.

The instant invention overcomes both of these faults. The first fault of variable fringe cut-off is remedied by providing a rectangular frame or mask containing an aperture between the antenna array and the aperture in the aircraft skin, and by securing the mask to the stabilized platform and the array so that as the aircraft pitches and rolls the mask remains stationary relative to the array. The second fault, reflection of part of the fringe energy back to the antenna, is remedied by coating the upper surface of the mask with an absorbing material.

One purpose of this invention is, in a radar antenna installed behind a window in the skin of an aircraft, the antenna being supported by a stabilized platform, to provide a device for preventing changes in radar beam direction due to canting of the aircraft.

Another purpose of this invention is, in such a radar antenna, to provide a device for preventing spurious radar echoes from metal surfaces near the antenna.

A further understanding of this invention may be secured from the detailed description and associated drawings, in which:

Figure 1 is a general view of a planar radar antenna positioned parallel to the earth and diagrammatically illustrating irradiation of the earth by its beams.

Figures 2 and 3 schematically depict a planar antenna irradiating the earth through an aperture, depicting the amount by which canting of the aperture changes effective beam directions.

Figures 4 and 5 illustrate the use of a mask to eliminate changes in beam direction due to canting of the aperture.

Figure 6 illustrates a mask for use with this invention.

Figure 7 depicts apparatus for raising and lowering the mask.

Figure 8 illustrates a cross section of the mask of Fig. 6 on line 4—4 showing the upper surface covered with absorbing material.

Figure 1:
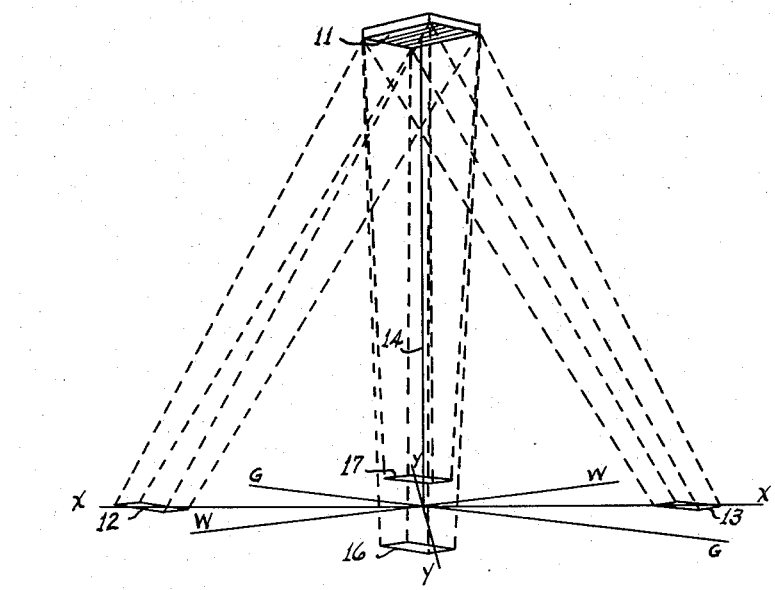

Referring now to Fig. 1 a planar microwave antenna array 11 is represented in a horizontal position in space with its radiating surface faced downward. The earth plane is represented by the lines X—X and Y—Y making equal angles with ground track G—G, so that the array as shown is positioned to project its beams toward the earth. The array consists of a number of individual microwave radiators or antennas of dipole, slot or other form, arranged in linear arrays which are combined in such configuration as to produce the desired beam pattern. As one example useful in exploiting the advantages of this invention, let it be supposed that the antenna arrangement is such that four beams are radiated obliquely toward the earth in four different directions. These beams are conventionalized in the figure so as to strike the earth plane in four rectangular spots, two of them, 12 and 13, being on the X—X line at an angle to the longitudinal axis of the array and equidistant from the vertical line 14 between the array and the earth. The other two, 16 and 17, lie on the Y—Y line at an equal but opposite angle to the longitudinal axis of the array and are equidistant from the vertical line 14. The conventionalized beams of microwave radiation are indicated by dashed lines.

Figures 2, 3:
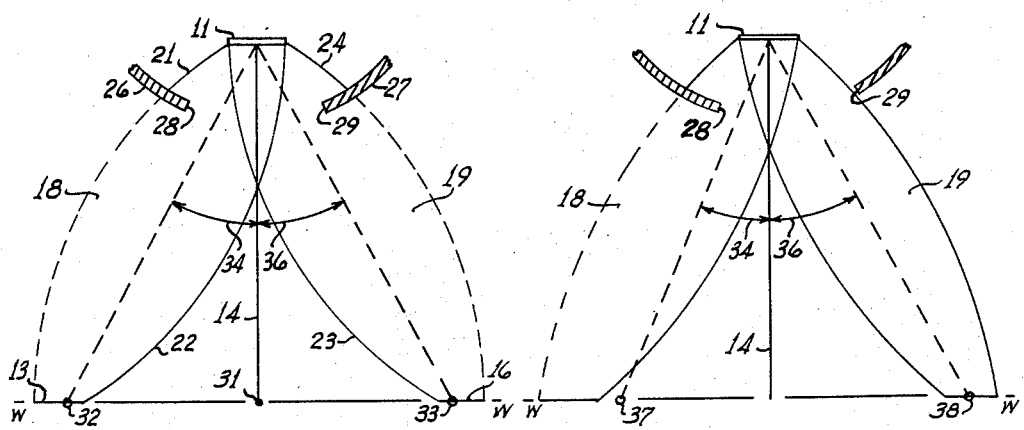

Fig. 2 is an elevational view of the antenna structure 11 and beam configuration of Fig. 1 taken in the transverse vertical plane through line W—W. Side beams 18 and 19 are conventionally illustrated by solid and dashed lines and are indicated as striking the earth in rectangles indicated by the lines 13 and 16. The beams contain fringes or edge portions of lower energy which are schematically indicated by the solid curved lines 21, 22, 23 and 24. The antenna 11 is carried by an aircraft having a skin in the vicinity of the antenna represented by the surfaces 26 and 27. These surfaces are interrupted directly beneath the antenna, representing an aperture transparent to microwave radiation. The inner ends 28 and 29 of surfaces 26 and 27, representing the sides of the aperture, are equidistant from the perpendicular 14 between the antenna and the earth as in level aircraft flight without roll or bank. In such level flight equal amounts of the fringes of the beams are cut off by the ends 28 and 29, so that the energy centers of the radiation targets 13 and 16 are displaced equally toward the center point 31 at the intersection of line 14 with the earth, these energy centers being indicated at 32 and 33. Thus although the effective beam directions are altered by the interference of the aircraft skin at the edges 28 and 29 of the aperture, they are altered equally, so that the beam angles 34 and 36 remain equal and the alterations have no effect on measurement of drift.

Fig. 3 is an end elevation identical with Fig. 2 except that the aircraft is canted, as during roll, so that its transverse axis is not parallel with the earth. Since the stabilizing mechanism maintains the platform level with the earth, the antenna 11 is parallel with the ground line W—W. However, since the aircraft is canted the aperture in the skin is no longer directly beneath the antenna array as is shown by the position of its edges, the edge 28 having moved toward the center line 14 and the edge 29 having moved away from the center. The edge 28 therefore cuts off more of the beam 18 while the edge 29 no longer cuts off any of beam 19. The effective center of beam 18 is therefore moved to point 37 while the effective center of beam 19 is moved to point 38. The beam angles 34 and 36 are therefore now unequal and their inequality will introduce error into determinations of drift using these angles.

Figs. 4 and 5 illustrate a mask 40 which prevents relative movement of the aircraft skin aperture from having effect on the beam center angles. The antenna array 11 radiates downward, as before, but its beam limits are now imposed by the rectangular mask 40 having an aperture smaller than the aperture in the aircraft skin. A plan view of the mask is illustrated in Fig. 6, the mask 40 containing an aperture 39. The mask is seen in Fig. 4 as section 4—4 of Fig. 6, the edges 41 and 42 of the mask being closer together than the edges 28 and 29 of the aperture in the skin of the aircraft. The mask is secured to the structure of the antenna array so as to be symmetrical therewith, the edges 41 and 42 being equidistant from the center line 14 and the edges 45 and 50, Fig. 6, also being equidistant from line 14. Since the mask is secured to the antenna structure, this symmetry is preserved at all times and is not affected by pitching or rolling of the aircraft. The amounts of fringe radiation cut off by the edges 41, 42, 50, and 55 of the mask from the two beams are therefore not changed by rolling or pitching, neither are the beam effective directions changed. In Fig. 4 the aircraft is without cant, so that the edges 28 and 29 of the skin are equidistant from the beams 18 and 19. In Fig. 5 the aircraft is canted so that the edge 28 of the skin touches but does not enter the beam 18, while edge 29 is distant from beam 19. This figure represents the maximum roll angle permitted by the design.

It is obvious that the mask cuts off some radiation of the antenna array, and in the absence of roll or pitch the mask cuts off radiation which would increase the signal-to-noise ratio without introducing error. If in this particular instance the mask could be removed by some means, radar effectiveness would be increased. One way of, in effect, removing the mask is to lift it toward the antenna assembly by a mechanism connected to the platform stabilizing mechanism, so that the raising of the mask is in proportion to the levelness of the aircraft.

Fig. 7 indicates a mechanism for effecting such motion of the mask toward the antenna array, the dotted lines 43' schematically indicating the position assumed by the mask at the extremities of roll and the full lines 43 indicating the position assumed when the aircraft is level. Vertical rods 44 and 45 are secured to the sides of the mask and carry pins 46 and 46' at their upper ends. These pins 46 and 46' serve as cam followers on two similar cams 47 and 48 which are made of such shape as to convert the rotary motion of shaft 49 actuating them to vertical motion of the followers having a linear relationship to the shaft motion. In some cases a relationship other than linear may be preferable and is readily secured by appropriate cam design. A motor 51 applies power to shaft 49, and is operated through a servomechanism 52 from a pendulous level platform device 53, previously mentioned. The motor 51 is also connected through shaft 49 to pinion 54 and gear 56 to maintain the antenna array 11 level in its transverse direction.

When the airplane is level and the edges 28 and 29 of the aircraft skin aperture are equidistant from the vertical center line of the antenna array, the mask is raised to its position 43; when on the other hand the edges 28 and 29 are not equdistant from the center line 14, the mask is lowered in proportion.

In order to avoid reflections from the mask back into the antenna, which in some cases would degrade the signal-to-noise ratio, the upper face 57 of the mask is covered with a dissipative layer which does not reflect microwave energy of a selected order of wavelengths. This is more clearly shown in the cross section of Fig. 8. In one construction this layer consists of finely divided carbon dispersed in a solid dielectric binder and backed by a highly conductive layer. In another construction a thin dissipative film of material such as carbon is secured to a dielectric sheet which in turn is secured to a highly conductive sheet. The thickness of the dissipative layer or of the dissipative film and dielectric sheet is such that, at the microwave frequency employed, the impedance presented by the surface to the impinging microwave energy is of the proper matching value. Since the impedance of free space is 377 ohms, this is the desired matching value.

What is claimed is:

1. In a microwave antenna array assembly for radiating beams in a plurality of directions away from one surface of a generating plane, said beams passing through an aperture in the skin of a vehicle bearing said assembly, said assembly being secured to a stabilized platform whereby relative motion may occur between said assembly and said skin aperture, the combination with said array of a conductive mask containing an aperture smaller than said skin aperture for the passage of said beams, said mask being positioned parallel to said antenna array and closer thereto than to said skin aperture, said mask being rigidly secured to said antenna array, whereby limited relative motion between said antenna array and said skin aperture cannot affect said beams.

2. In a microwave planar antenna array structure for radiating a plurality of beams at acute angles to the normal thereto through an aperture in the conducting skin of a vehicle carrying said structure, said array being secured to a horizontally stabilized platform whereby motion of said conducting skin and the aperture therein may occur relative to said array, the combination with said array of a conductive planar mask containing an aperture smaller than said skin aperture for the passage of said plurality of beams, said planar mask being rigidly secured to said planar antenna array and positioned parallel thereto between said planar antenna array and said skin aperture, whereby limited relative motion between said planar antenna array and said skin aperture is without effect on the effective direction of any of said plurality of beams.

3. An antenna structure as set forth in claim 2 wherein the surface of the mask presented to the array is made non-reflective to microwave energy.

4. An antenna structure as set forth in claim 2 wherein the surface of the mask presented to the array is coated with a layer of comminuted dissipative material dispersed in a dielectric.

5. An antenna structure as set forth in claim 2 in which the surface of the mask presented to the array is provided with a layer, the surface impedance of which matches the impedance of free space.

6. An antenna structure as set forth in claim 2 having means operated by said horizontally stabilized platform for varying the distance between said array and said mask so that the distance is the least when the aircraft is horizontal and is greater at any other attitude of the aircraft.

References Cited in the file of this patent

UNITED STATES PATENTS 2,599,944    Salisbury _____ June 10, 1952

FOREIGN PATENTS 942,931    France _____ Feb. 22, 1949